United States Patent
Hsia

(10) Patent No.: US 10,390,394 B2
(45) Date of Patent: Aug. 20, 2019

(54) SOLID-STATE LIGHTING WITH AN INTERFACE BETWEEN AN INTERNAL CONTROL VOLTAGE AND AN EXTERNAL VOLTAGE

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 16/296,864

(22) Filed: Mar. 8, 2019

(65) Prior Publication Data

US 2019/0208592 A1    Jul. 4, 2019

Related U.S. Application Data

(63) Continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a (Continued)

(51) Int. Cl.
*H05B 33/08* (2006.01)
*H02M 1/42* (2007.01)

(52) U.S. Cl.
CPC ...... *H05B 33/0815* (2013.01); *H02M 1/4258* (2013.01); *H05B 33/089* (2013.01)

(58) Field of Classification Search
None
See application file for complete search history.

(56) References Cited

U.S. PATENT DOCUMENTS 6,775,164 B2 * 8/2004 Wong ..................... H02M 1/36
                                                    363/147
10,098,194 B1 * 10/2018 Xiong ............... H05B 33/0821
(Continued)

*Primary Examiner* — Minh D A
*Assistant Examiner* — James H Cho
(74) *Attorney, Agent, or Firm* — Han IP PLLC; Andy M. Han

(57) ABSTRACT

An LED luminaire comprises a power converter, a power switching driver, LED array(s) powered by the power switching driver, and a voltage detection circuit. The voltage detection circuit comprises a first voltage detection circuit, a second voltage detection circuit, a voltage regulator circuit, an optocoupler circuit, and a pair of low-voltage input ports receiving an external voltage. The voltage detection circuit is configured to extract a flyback signal from an output voltage and the external voltage and to couple the flyback signal to the power switching driver. The external voltage comprises a voltage sent from a Zigbee luminaire controller, which comprises a Zigbee module and a meter and control unit. The Zigbee luminaire controller is configured to receive commands from the Zigbee module, to control the LED luminaire, and to measure in response to the commands.

20 Claims, 3 Drawing Sheets

Related U.S. Application Data continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 2013/0162158 A1* | 6/2013 | Pollischansky | H05B 33/0815 315/201 |
| 2013/0300310 A1* | 11/2013 | Hu | H05B 33/0854 315/239 |

* cited by examiner

SOLID-STATE LIGHTING WITH AN INTERFACE BETWEEN AN INTERNAL CONTROL VOLTAGE AND AN EXTERNAL VOLTAGE

CROSS-REFERENCE TO RELATED APPLICATIONS

The present disclosure is part of a continuation-in-part (CIP) application of U.S. patent application Ser. No. 16/269,510, filed 6 Feb. 2019, which is part of CIP application of U.S. patent application Ser. No. 16/247,456, filed 14 Jan. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaires and more particularly to an LED luminaire with an internal control voltage to interface with an external voltage for dimming control in order to reduce lighting energy consumption and to measure some operating parameters in response to commands received from a Zigbee luminaire controller.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an alternate-current (AC) mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, AC mains-operable LED lamps do not require a ballast to operate. Before use of the AC mains-operable LED lamps, the ballast in a fixture must be removed or bypassed. Removing or bypassing the ballast does not require an electrician and can be replaced by end users. Each of AC mains-operable LED lamps is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies. Moreover, the AC mains-operable LED lamps consume less power than ballast compatible LED lamps do because extra power consumed by the ballast is saved.

To further save lighting energy cost, the lighting industry proposed to use daylight harvesting years ago. In daylight harvesting, the ambient light such as natural daylight and an artificial light present in a space is utilized to reduce overhead lighting. When a sufficient ambient light level is present or when the space is unoccupied, a control mechanism in a daylight harvesting system dims or switches off the artificial light in the system. The daylight harvesting system is typically designed to maintain a recommended light level, which varies depending on activity needs in the space. For instance, the commonly recommended light level for normal office work, study library, personal computer work, groceries, show rooms, and laboratory is 500 lux on the desktop, whereas in warehouses and homes, the recommended light level is 250 lux.

The daylight harvesting system uses a photo-sensor to detect a prevailing light level in an open-loop or a closed-loop manner. The photo-sensor is used to adjust light level from electric lighting based on the available daylight in the space. In an open-loop system, the photo-sensor is used to detect the amount of available daylight only and can be positioned on the building's exterior wall or roof, or inside the building facing the window or skylight. In a closed-loop system, the photo-sensor is used to measure total photometric amount of light, from both daylight and electric lighting in the space. For instance, in an office, a closed-loop photo-sensor can be positioned on the ceiling facing the desktops in order to detect the amount of light on the work surface. In both the open- and closed-loop configurations, the signal from the photo-sensor must be calibrated to accurately show the effect of exterior daylight variations on the light level for activities in the space.

Studies have shown that by using daylight harvesting technologies, owners can have an average annual energy savings of 24%. Even with such a potential energy saving, some of daylight harvesting systems still cannot be widely accepted. In fact, impressive energy savings estimates may not be realized in practice due to a poor system design, a time-consuming calibration, or a complicated commissioning. High costs and imperfect performance of the technologies also inhibit the adoption of daylight harvesting technologies.

The AC mains-operable LED luminaires can easily be used with a Zigbee lighting control system, taking advantages of no rewiring needed for lighting control using a Zigbee protocol. No wiring or rewiring can save dramatic installation cost, and such a lighting control system is free of the wiring errors in contrast to an all wired system that is highly susceptible to such errors. With the acceleration of LED luminaire deployment in the lighting industry, the needs of energy saving, utilization efficiency of lighting energy, and intelligent control of lighting have become very urgent. Traditional luminaire controls have drawbacks such as no scheduling possible for manual switch control, susceptibility of the interference by the strong magnetic field from a power line for power carrier control, and failing to meet the requirements of centralized monitoring, recording, and energy management. On the other hand, the lighting industry needs control systems that can program different lighting schedules across multiple zones based on shifts or the type of work occurring throughout the day. Moreover, users can dim individual lights or adjust light levels for any area in buildings and streets or scheduling for more energy savings. It is, therefore, a motive to design such an LED luminaire incorporating a cost-effective remote control using the Zigbee protocol, which is simple to implement without commissioning in the field.

SUMMARY

An LED luminaire comprises one or more LED arrays, a power converter configured to convert a line voltage from alternate-current (AC) mains into a first direct-current (DC) voltage, a power switching driver, and a voltage detection circuit. The power switching driver comprises a transformer having a primary side relative to a first ground reference and a secondary side relative to a second ground reference, a power factor correction (PFC) and control circuit, and a flyback control input. The power switching driver is coupled to the power converter and configured to convert the first DC voltage into a second DC voltage with an output current driving the one or more LED arrays. The voltage detection circuit comprises a first voltage detection circuit, a second voltage detection circuit, a voltage regulator circuit, an optocoupler circuit, and a pair of low-voltage input/output ports receiving an external voltage. The first voltage detection circuit and the second voltage detection circuit are respectively configured to extract a flyback signal from the second DC voltage and the external voltage and to couple to the power switching driver. The optocoupler circuit comprises an LED and a photo-detector. The LED is configured to receive the flyback signal from both the first voltage detection circuit and the second voltage detection circuit and to illuminate the photo-detector. The photo-detector is configured to receive the flyback signal in an optical form, to recover the flyback signal in an optical form to an electric signal, and to control the power switching driver. Thus, a combination of the LED and the photo-detector is configured to electrically isolate the second ground reference from the first ground reference. The flyback control input is configured to receive the electric signal for the power switching driver to provide the output current driving the one or more LED arrays in response to the flyback signal.

The power converter comprises a filter configured to reduce ripples at a mains frequency and twice the mains frequency on the first DC voltage and consequently to improve ripples on both the second DC voltage and the output current driving the one or more LED arrays to emit a light with a lowered flicker rate. The power switching driver further comprises a first rectifier, at least one output capacitor, and at least one output resistor connected in parallel with the at least one output capacitor. The first rectifier, the at least one output capacitor, and the at least one output resistor are configured to build up the second DC voltage to drive the one or more LED arrays. The power switching driver further comprises a second rectifier connected to a center tap of the transformer. The second rectifier is configured to provide an unregulated DC voltage.

The first voltage detection circuit comprises a first operational amplifier, a first voltage reference, and a first diode. The first voltage detection circuit is configured to monitor the second DC voltage and to partially control a current flowing through the LED. The second voltage detection circuit comprises a second operational amplifier, a second voltage reference, a voltage divider coupled to the second operational amplifier, and a second diode. The second voltage detection circuit is configured to monitor the external voltage and to partially control a current flowing through the LED.

The voltage regulator circuit comprises a first voltage regulator circuit and a second voltage regulator circuit. The first voltage regulator circuit comprises a first Zener diode and a transistor coupled to the Zener diode. The first voltage regulator circuit is configured to receive the unregulated DC voltage and to convert the unregulated DC voltage into a third DC voltage, which is regulated, to operate the first operational amplifier and the second operational amplifier. The second voltage regulator circuit comprises at least one transistor, a third diode, and a second Zener diode. The second voltage regulator circuit is configured to convert the third DC voltage into a fourth DC voltage and to interface the fourth DC voltage with the external voltage. The third diode is configured to control the fourth DC voltage to appear at the pair of low-voltage input/output ports when the pair of low-voltage input/output ports are floating with respect to a voltage level thereof. The third diode is further configured to control the external voltage to couple to the second voltage detection circuit. The third DC voltage is further configured to operate the LED in such a way that a control current corresponding to the flyback signal can flow through the LED.

The PFC and control circuit further comprises a controller, a diode, and at least one switch. The controller is configured to receive a signal from the photo-detector and to control the at least one switch to be turned "on" or "off" in a way that a duty cycle is decreased when the first voltage detection circuit detects that the second DC voltage exceeds a predetermined value or when the second voltage detection circuit detects that the external voltage exceeds a predetermined value, so as to reduce the second DC voltage or the output current driving the one or more LED arrays. When the external voltage is applied to the pair of low-voltage input/output ports of the voltage detection circuit, the controller controls the duty cycle according to the external voltage to increase or decrease the second DC voltage or the output current driving the one or more LED arrays. The external voltage may comprise a nominal DC voltage in a range from 0 to 10 volts.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
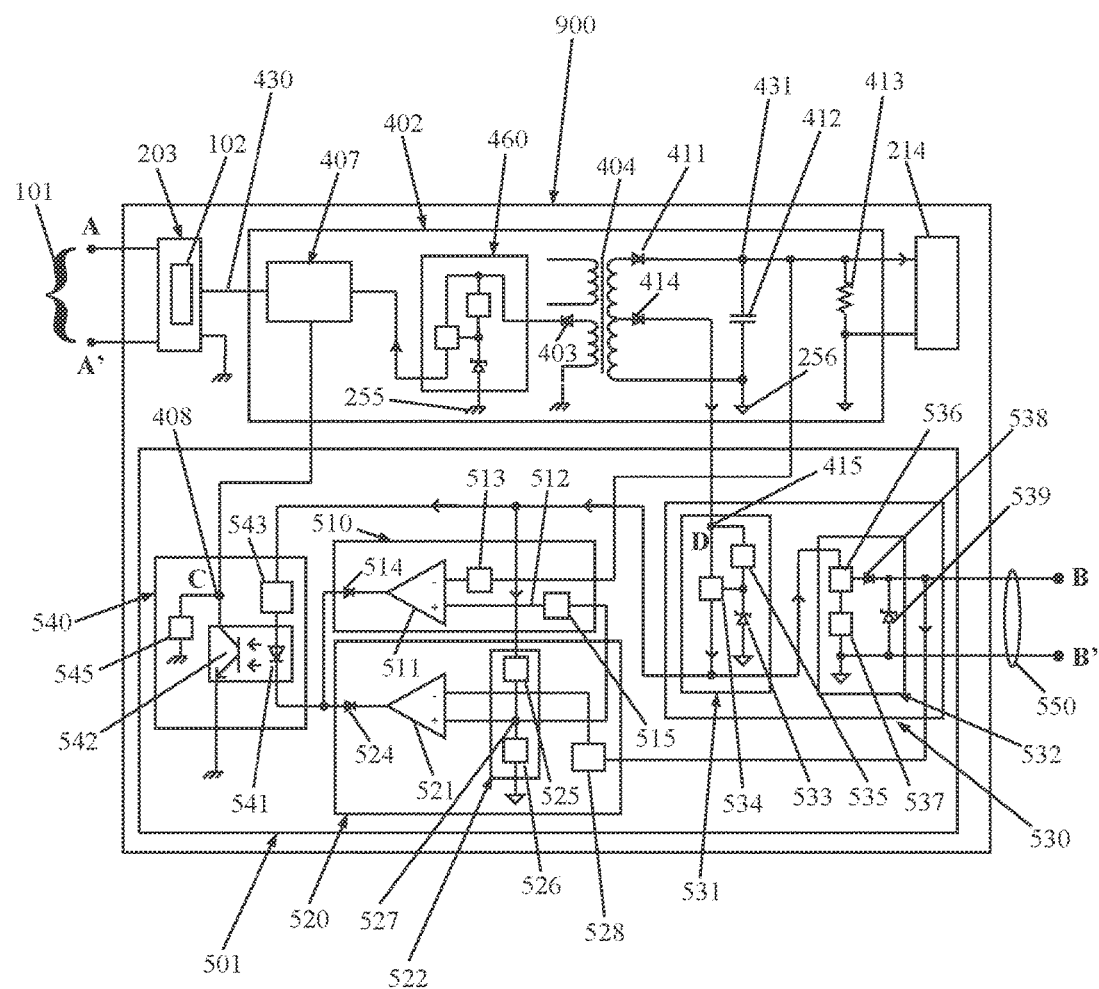
FIG. 1 is a block diagram of an LED luminaire with an interface between an internal control voltage and an external voltage according to the present disclosure.

FIG. 1 is a block diagram of an LED luminaire 900 with an interface between an internal control voltage and an external voltage according to the present disclosure. The LED luminaire 900 comprises one or more LED arrays 214, a power converter 203 connected to a pair of AC power input ports 101 receiving a line voltage from the AC mains, a power switching driver 402, and a voltage detection circuit 501. The pair of AC power input ports 101 are also denoted as AA'. The power converter 203 comprises a filter 102 and is configured to convert a line voltage from alternate-current (AC) mains into a first direct-current (DC) voltage. The power switching driver 402 comprises a transformer 404 having a primary side relative to a first ground reference 255 and a secondary side relative to a second ground reference 256, a power factor correction (PFC) and control circuit 407, and a flyback control input 408. The power switching driver 402 is coupled to the power converter 203 via the filter 102 and a power input 430 and is configured to convert the first DC voltage into a second DC voltage with an output current driving the one or more LED arrays 214 via a DC output 431. The filter 102 is configured to reduce ripples at a mains frequency and twice the mains frequency on the first DC voltage and consequently to improve ripples on both the second DC voltage and the output current driving the one or more LED arrays 214 to emit a light with a lowered flicker rate. The power switching driver 402 further comprises a first regulator circuit 460 and a third rectifier 403 connected to an auxiliary winding of the transformer 404. The first regulator circuit 460 is configured to provide a regulated voltage to operate the PFC and control circuit 407. The flyback control input 408 is an input/output port, also denoted as "C", configured to provide a fifth DC voltage to the voltage detection circuit 501 and to receive a flyback voltage from the voltage detection circuit 501. In FIG. 1, the power converter 203 may simply be a full-wave rectifier with a filter.

The power switching driver 402 further comprises a first rectifier 411, at least one output capacitor 412, and at least one output resistor 413 connected in parallel with the at least one output capacitor 412. The first rectifier 411, the at least one output capacitor 412, and the at least one output resistor 413 are configured to build up the second DC voltage to drive the one or more LED arrays 214. The power switching driver 402 further comprises a second rectifier 414 configured to provide an unregulated DC voltage.

In FIG. 1, the voltage detection circuit 501 comprises a first voltage detection circuit 510, a second voltage detection circuit 520, a voltage regulator circuit 530, an optocoupler circuit 540, and a pair of low-voltage input/output ports 550 receiving an external voltage. The voltage regulator circuit 530 comprises a second voltage regulator circuit 531 and a third voltage regulator circuit 532. The second voltage regulator circuit 531 is configured to regulate the unregulated DC voltage from the second rectifier 414 into a fourth DC voltage. The pair of low-voltage input/output ports 550 are also denoted as ports BB', where a relatively high voltage potential appears at port B, and a relatively low voltage potential appears at port B'. The external voltage can thus be expressed as $V_{BB'}$. The first voltage detection circuit 510 and the second voltage detection circuit 520 are respectively configured to extract a flyback signal from the second DC voltage and the external voltage and to couple to the power switching driver 402. The optocoupler circuit 540 comprises an LED 541 and a photo-detector 542. The LED 541 is configured to receive the flyback signal from both the first voltage detection circuit 510 and the second voltage detection circuit 520 and to illuminate the photo-detector 542. The fourth DC voltage, regulated from the second voltage regulator circuit 531, is configured to operate the first voltage detection circuit 510, the second voltage detection circuit 520, and the LED 541. The photo-detector 542 is configured to receive the flyback signal in an optical form, to recover the flyback signal in an optical form to an electric signal, and to control the power switching driver 402. Thus, a combination of the LED 541 and the photo-detector 542 is configured to electrically isolate the second ground reference 256 from the first ground reference 255. The flyback control input 408, also denoted as C, is configured to receive the electric signal for the power switching driver 402 to provide the output current driving the one or more LED arrays 214 in response to the flyback signal. The optocoupler circuit 540 further comprises a compensation circuit 545 configured to adapt the fifth DC voltage according to the current flowing through the photo-detector 542 and to send to the PFC and control circuit 407.

In FIG. 1, the first voltage detection circuit 510 comprises a first operational amplifier 511, a first voltage reference 512 coupled to the first operational amplifier 511, and a first diode 514. The first voltage detection circuit 510 is configured to monitor the second DC voltage at the DC output 431 and to partially control a current flowing into the first operational amplifier 511. The second voltage detection circuit 520 comprises a second operational amplifier 521, a voltage divider 522 coupled to the second operational amplifier 521, and a second diode 524. The second voltage detection circuit 520 is configured to monitor the external voltage at a port 550 and to partially control a current flowing into the second operational amplifier 521. The voltage divider 522 comprises a first resistor 525 and a second resistor 526 connected in series with the first resistor 525 at a common connection port. A sampled voltage from the common connection port provides a second voltage reference 527 coupled to the second operational amplifier 521. The voltage divider 522 also provides the first voltage reference 512 coupled to the first operational amplifier 511 via a third resistor 515. The first voltage reference 512 provided through the third resistor 515 is inputted to a non-inverting input of the first operational amplifier 511, whereas the second DC voltage is sampled and inputted to an inverting input of the first operational amplifier 511 via a fourth resistor 513 for the operational amplifier 511 to detect if the second DC voltage exceeds a predetermined value. The sampled voltage extracted from the common connection port of the voltage divider 522 is sent to a non-inverting input of the second operational amplifier 521 as a second voltage reference 512 whereas the external voltage $V_{BB'}$ is sampled and inputted to an inverting input of the second operational amplifier 521 via a fifth resistor 528 for the second operational amplifier 521 to detect if the external voltage $V_{BB'}$ exceeds a predetermined value.

In FIG. 1, the second voltage regulator circuit 531 comprises a first Zener diode 533, a transistor 534 coupled to the first Zener diode 533, and a sixth resistor 535. The second voltage regulator circuit 531 is configured to receive the unregulated DC voltage from the second rectifier 414 and to convert the unregulated DC voltage into a third DC voltage to operate the first operational amplifier 510, the second operational amplifier 520, and the LED. The third voltage regulator circuit 532 comprises at least one transistor 536, a resistor 537, a third diode 538, and a second Zener diode 539. The third voltage regulator circuit 532 is configured to interface an internal control voltage, which is the fourth DC voltage, with the external voltage $V_{BB'}$ such that the third diode 538 controls the fourth DC voltage to appear at the pair of low-voltage input/output ports 550 when the pair of low-voltage input/output ports 550 are floating with respect to a voltage level thereof. The third diode 538 is further configured to control the external voltage $V_{BB'}$ to couple to the second voltage detection circuit 520 to determine if the external voltage $V_{BB'}$ exceeds the predetermined value.

Figure 2:
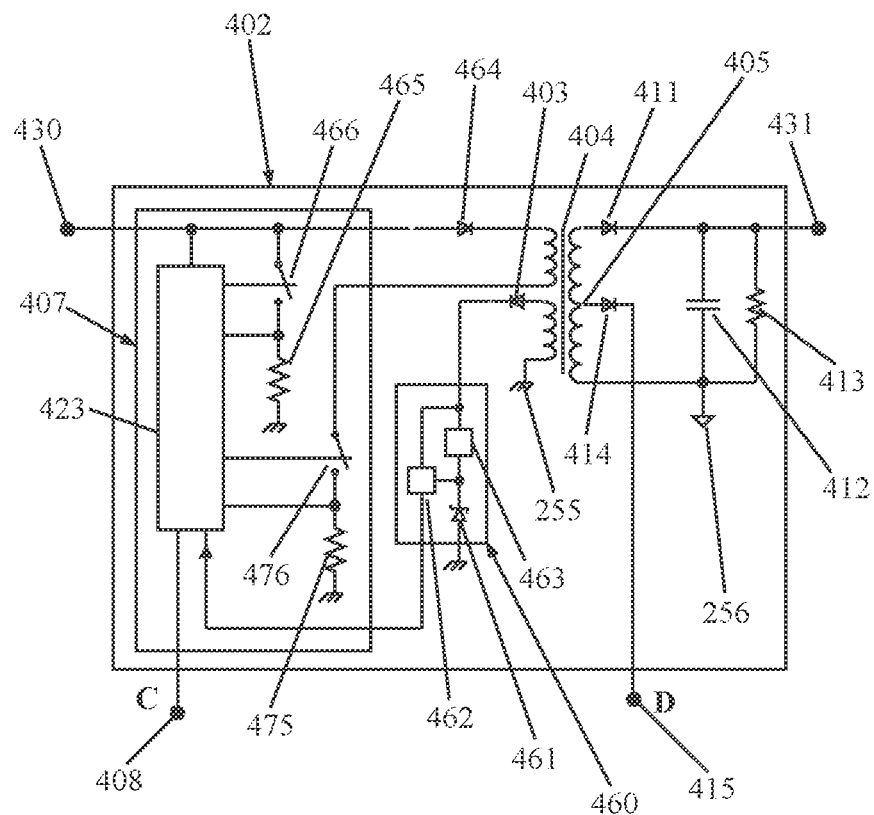
FIG. 2 is an embodiment of a power switching driver according to the present disclosure.

FIG. 2 is an embodiment of the power switching driver 402 according to the present disclosure. The power switching driver 402 comprises a transformer 404 having a primary side relative to a first ground reference 255 and a secondary side relative to a second ground reference 256, a power factor correction (PFC) and control circuit 407, and an input/output port 408, also denoted as "C", same as the flyback control input in FIG. 1. The power switching driver 402 is coupled to the power converter 203 (in FIG. 1) via the filter 102 and a power input 430 and is configured to convert the first DC voltage into a second DC voltage with an output current driving the one or more LED arrays 214 (in FIG. 1) via a DC output 431. The power switching driver 402 further comprises a third rectifier 403 connected to an auxiliary winding of the transformer 404, a controller 423, and a first regulator circuit 460. The first regulator circuit 460 is configured to provide a regulated voltage to operate the controller 423 and the PFC and control circuit 407. The input/output port 408, also denoted as "C", is configured to provide the fifth DC voltage to the voltage detection circuit 501 and to receive a flyback voltage from the voltage detection circuit 501. This is the reason why the flyback control input 408 is also said as input/output port.

The power switching driver 402 further comprises a first rectifier 411, at least one output capacitor 412, and at least one output resistor 413 connected in parallel with the at least one output capacitor 412. The first rectifier 411, the at least one output capacitor 412, and the at least one output resistor 413 are configured to build up the second DC voltage to drive the one or more LED arrays 214. The power switching driver 402 further comprises a second rectifier 414 connected to a center tap 405 of the transformer 404. The second rectifier 414 is configured to provide an unregulated DC voltage to the voltage regulator circuit 530 via an output port 415, also denoted as "D".

In FIG. 2, the first voltage regulator circuit 460 comprises a third Zener diode 461, a transistor 462 coupled to the third Zener diode 461, and a resistor 463. The first voltage regulator circuit 460 is configured to receive an unregulated DC voltage from the third rectifier 403 and to convert the unregulated DC voltage into a fifth DC voltage to operate the controller 423. The PFC and control circuit 407 further comprises a fourth diode 464, a first at least one current sensing resistor 465, and a first switch 466 controlled by the controller 423. The first switch 466 is configured to be turned "on" or "off" in a way that a power factor is well corrected to meet power factor requirements. As shown in FIG. 2, the first ground reference 255 and the second ground reference 256 are respectively in the primary side and the secondary side of the transformer 404. The PFC and control circuit 407 may further comprise a second at least one current sensing resistor 475 and a second switch 476 controlled by the controller 423. The controller 423 is configured to receive a flyback signal from the first photo-detector 542 via the input/output ports 408 and to control the first switch 466 to be turned "on" or "off" in a way that a duty cycle is decreased when the first voltage detection circuit 510 detects that the second DC voltage exceeds a predetermined one or when the second voltage detection circuit 520 detects that the external voltage $V_{BB'}$ is less than a predetermined one, so as to reduce the second DC voltage or the output current driving the one or more LED arrays 214 in response to the external voltage $V_{BB'}$. That is to say, when the external voltage is applied to the pair of low-voltage input/output ports 550 of the voltage detection circuit 501, the controller 423 controls the duty cycle according to the external voltage to increase or decrease the second DC voltage or the output current driving the one or more LED arrays 214.

Figure 3:
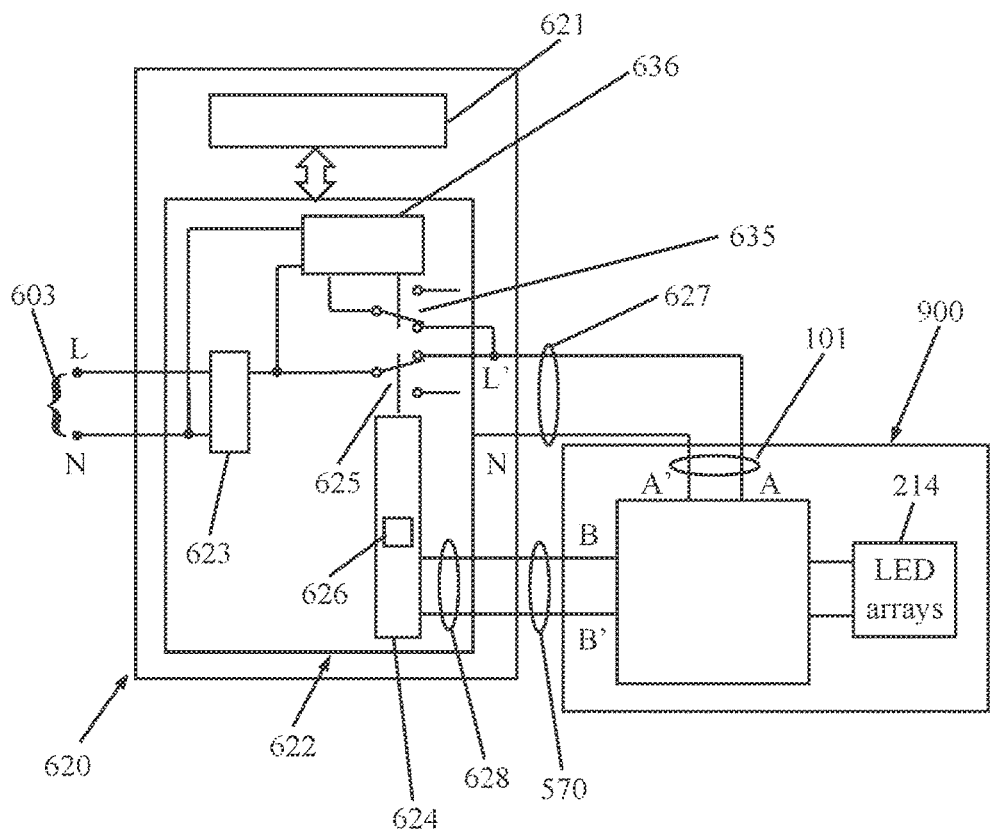
FIG. 3 is a block diagram of the LED luminaire integrated with a Zigbee luminaire controller according to the present disclosure.

FIG. 3 is a block diagram of the LED luminaire integrated with a Zigbee luminaire controller according to the present disclosure. In FIG. 3, the LED luminaire 900 comprises the pair of AC power input ports 101, also denoted as AA', and the pair of low-voltage input/output ports 570, also denoted as ports BB'. The pair of AC power input ports 101 and the pair of low-voltage input/output ports 570 are connected to a Zigbee luminaire controller 620. The Zigbee luminaire controller 620 comprises a Zigbee module 621 configured to communicate with a gateway (not shown) by receiving commands of switching, 0-to-10 volts dimming, and metering from the gateway and responding to luminaire statuses and metering results to the gateway. The Zigbee luminaire controller 620 further comprises a meter and control unit 622 receiving commands from the Zigbee module 621. The meter and control unit 622 is configured to control the LED luminaire 900 via the pair of AC power input ports 101 and the pair of low-voltage input/output ports 570 and to measure in response to the commands. The meter and control unit 622 comprises one or more meters 623 configured to measure an AC current, an AC voltage, a temperature, a frequency, an active power, or a reactive power.

In FIG. 3, the meter and control unit 622 further comprises a power and low-voltage controller 624 configured to control an AC power to deliver to the power switching driver 402 (in FIG. 1) of the LED luminaire 900 via the pair of AC power input ports 101 and to control the external voltage $V_{BB'}$ via the pair of low-voltage input/output ports 570. The meter and control unit 622 further comprises a first relay 625 controlled by the power and low-voltage controller 624 and a second relay 635 controlled by a photo control 636. The photo control 636 is configured to overwrite commands of the switching and the 0-to-10 volts dimming and to turn on the AC power to couple to the power switching driver 402 of the LED luminaire 900 when an ambient light level is below a predetermined value. In other words, when the ambient light level is below a predetermined value, say 1.5 foot-candle, the photo control 636 instantly controls the relay 635 to immediately turn on the AC power to the LED luminaire 900. In this case, the Zigbee luminaire controller 620 may further comprise a pair of controlled AC outputs 627 coupled to the power switching driver 402 (in FIG. 1) of the LED luminaire 900. As can be seen in FIG. 3, the first relay 625 and the second relay 635 are connected at the port L' of the pair of controlled AC outputs 627 to make sure that the power switching driver 402 (in FIG. 1) in the LED luminaire 900 can receive the AC power through the second relay 635 when the photo control 636 is activated in a low-light level regardless a Zigbee command to turn off the LED luminaire 900.

In FIG. 3, the Zigbee luminaire controller 620 further comprises a pair of AC input ports 603 receiving the AC power from the AC mains and a pair of low-voltage output ports 628. The pair of AC input ports 603 are also denoted as LN whereas the pair of AC output ports 627 are also denoted as L'N. The pair of low-voltage output ports 628 is connected to the pair of low-voltage input/output ports 570 in the LED luminaire 900. The pair of AC output ports 627 connected to the relay 625 is connected to the pair of AC power input ports 101 in the LED luminaire 900. When the AC power LN is available, the relay 625 is enabled by the power and low-voltage controller 624 to couple the AC power LN to the pair of AC output ports 627 and to deliver a controlled power to the pair of AC power input ports 101 denoted as AA' in the LED luminaire 900 providing the controlled power to operate the LED luminaire 900.

In FIG. 3, the power and low-voltage controller 624 may comprise a built-in photo control 626. When the AC power LN 603 is available but the command received from the Zigbee module 621 demands turning off the LED luminaire 900, the power and low-voltage controller 624 controls the relay 625 to disconnect the AC power LN 603 to the pair of AC output ports 627, thus completely shutting off the LED luminaire 900 for conserving energy. When the AC power LN 603 is available and the built-in photo control 626 detects an ambient light level is lower than a predetermined value, the power and low-voltage controller 624 controls the relay 625 to couple the AC power LN 603 to the pair of AC output ports 627 and to deliver the controlled power L'N to the pair of AC power input ports 101 in the LED luminaire 900 providing the controlled power to operate the LED luminaire 900. Therefore, the built-in photo control 626 overwrites the command to turn on the LED luminaire 900 for security reasons. On the other hand, when the AC power LN 603 is available and the built-in photo control 626 detects the ambient light level is higher than another predetermined value, say 2.25 foot-candle, the power and low-voltage controller 624 controls the relay 625 to disconnect the AC power LN 603 to the pair of AC output ports 627 and to disconnect the controlled power L'N to the pair of AC power input ports 101, shutting off the LED luminaire 900. The built-in photo control 626 overwrites the command to shut off the LED luminaire 900 for energy saving. That is to say that the pair of controlled AC outputs 627 is configured to connect to the pair of AC power input ports 101 and to turn on or shut off an AC power to the power switching driver 402. The external voltage $V_{BB'}$ at the pair of low-voltage input/output ports 570 comprises a nominal DC voltage in a range from 0 to 10 volts. The second relay 635 controlled by the photo control 636 may be redundant but needed in some cases to prevent failure of the built-in photo control 626. The photo control 636 may overwrite a command of turning off the LED luminaire 900 and to turn on the LED luminaire 900 when an ambient light level is below a predetermined value.

Whereas preferred embodiments of the present disclosure have been shown and described, it will be realized that alterations, modifications, and improvements may be made thereto without departing from the scope of the following claims. Another kind of schemes with an interface between an internal control voltage and an external voltage may be adopted in an LED luminaire using various kinds of combinations to accomplish the same or different objectives could be easily adapted for use from the present disclosure. Accordingly, the foregoing descriptions and attached drawings are by way of example only, and are not intended to be limiting.

What is claimed is:

1. A light-emitting diode (LED) luminaire, comprising:
  one or more LED arrays;
  a power converter configured to convert a line voltage from alternate-current (AC) mains into a first direct-current (DC) voltage;
  a power switching driver comprising a transformer having a primary side relative to a first ground reference and a secondary side relative to a second ground reference, a power factor correction (PFC) and control circuit, and a flyback control input, the power switching driver coupled to the power converter and configured to convert the first DC voltage into a second DC voltage with an output current driving the one or more LED arrays; and a voltage detection circuit comprising a first voltage detection circuit, a second voltage detection circuit, a voltage regulator circuit, an optocoupler circuit, and a pair of low-voltage input/output ports receiving an external voltage, the first voltage detection circuit and the second voltage detection circuit respectively configured to extract a flyback signal from the second DC voltage and the external voltage and to couple to the power switching driver;

wherein:
the optocoupler circuit comprises an LED and a photo-detector;
the LED is configured to receive the flyback signal from both the first voltage detection circuit and the second voltage detection circuit and to illuminate the photo-detector;
the photo-detector is configured to receive the flyback signal in an optical form, to convert the flyback signal from the optical form to an electric signal, and to control the power switching driver;
a combination of the LED and the photo-detector is configured to electrically isolate the second ground reference from the first ground reference; and
the flyback control input is configured to receive the electric signal from the photo-detector for the power switching driver to provide the output current driving the one or more LED arrays in response to the flyback signal.

2. The LED luminaire of claim 1, wherein the first voltage detection circuit comprises a first operational amplifier, a first voltage reference, and a first diode, and wherein the first voltage detection circuit is configured to monitor the second DC voltage and to partially control a current flowing through the LED.

3. The LED luminaire of claim 1, wherein the second voltage detection circuit comprises a second operational amplifier, a second voltage reference, a voltage divider coupled to the second operational amplifier, and a second diode, and wherein the second voltage detection circuit is configured to monitor the external voltage and to partially control a current flowing through the LED.

4. The LED luminaire of claim 1, wherein the power switching driver further comprises a first rectifier, at least one output capacitor, and at least one output resistor connected in parallel with the at least one output capacitor, and wherein the first rectifier, the at least one output capacitor, and the at least one output resistor are configured to build up the second DC voltage to drive the one or more LED arrays.

5. The LED luminaire of claim 1, wherein the power switching driver further comprises a second rectifier connected to a center tap of the transformer, and wherein the second rectifier is configured to provide an unregulated DC voltage.

6. The LED luminaire of claim 5, wherein the voltage regulator circuit comprises a first voltage regulator circuit comprising a first Zener diode and a transistor coupled to the Zener diode, and wherein the first voltage regulator circuit is configured to receive the unregulated DC voltage and to convert the unregulated DC voltage into a third DC voltage to operate the first operational amplifier and the second operational amplifier.

7. The LED luminaire of claim 6, wherein the voltage regulator circuit further comprises a second voltage regulator circuit comprising at least one transistor, a third diode, and a second Zener diode, and wherein the second voltage regulator circuit is configured to convert the third DC voltage into a fourth DC voltage and to interface the fourth DC voltage with the external voltage.

8. The LED luminaire of claim 7, wherein the third diode is configured to control the fourth DC voltage to appear at the pair of low-voltage input/output ports when the pair of low-voltage input/output ports are floating with respect to a voltage level thereof, and wherein the third diode is further configured to control the external voltage to couple to the second voltage detection circuit.

9. The LED luminaire of claim 6, wherein the third DC voltage is configured to operate the LED in such a way that a control current corresponding to the flyback signal can flow through the LED.

10. The LED luminaire of claim 1, wherein the power switching driver further comprises a third rectifier configured to provide a fifth DC voltage to operate the photo-detector.

11. The LED luminaire of claim 1, wherein the power converter comprises a filter configured to reduce ripples at a mains frequency and at twice the mains frequency on the first DC voltage and consequently to improve ripples on both the second DC voltage and the output current driving the one or more LED arrays to emit a light with a lowered flicker rate.

12. The LED luminaire of claim 1, wherein the external voltage comprises control signals received from a Zigbee luminaire controller.

13. The LED luminaire of claim 12, further comprising the Zigbee luminaire controller, wherein the Zigbee luminaire controller comprises a Zigbee module configured to receive commands of switching, 0-to-10 volts dimming, and metering and to respond to luminaire statuses and metering results.

14. The LED luminaire of claim 13, wherein the Zigbee luminaire controller further comprises a meter and control unit configured to receive the commands from the Zigbee module and to control the LED luminaire.

15. The LED luminaire of claim 14, wherein the meter and control unit comprises one or more meters configured to, in response to the commands, measure an AC current, an AC voltage, a temperature, a frequency, or an active power.

16. The LED luminaire of claim 14, wherein the meter and control unit comprises a power and low-voltage controller configured to control an AC power to couple to the power switching driver and to control the external voltage.

17. The LED luminaire of claim 16, wherein the meter and control unit further comprises a first photo control comprising a first relay, and wherein the photo control is configured to overwrite commands of the switching and the 0-to-10 volts dimming and to turn on the AC power to couple to the power switching driver when an ambient light level is below a predetermined value.

18. The LED luminaire of claim 16, wherein the meter and control unit further comprises a second photo control comprising a second relay, and wherein the second photo control is configured to duplicate the first photo control for preventing failure of the first photo control and to overwrite commands of the switching and the 0-to-10 volts dimming and to turn on the AC power to couple to the power switching driver when an ambient light level is below a predetermined value.

19. The LED luminaire of claim 13, wherein the Zigbee luminaire controller further comprises a pair of controlled AC outputs coupled to the power switching driver, and wherein the pair of controlled AC outputs is configured to turn on or shut off an AC power to the power switching driver.

20. The LED luminaire of claim 1, wherein the external voltage comprises a nominal DC voltage in a range from 0 to 10 volts.

* * * * *